United States Patent [19]
Allen et al.

[11] Patent Number: 5,621,301
[45] Date of Patent: *Apr. 15, 1997

[54] CONNECTING MULTIPLE BATTERIES TO BATTERY POWERED DEVICES

[75] Inventors: Paul M. Allen, Cincinnati; John R. Kuhn, West Chester, both of Ohio

[73] Assignee: Technoggin, Inc., Cincinnati, Ohio

[*] Notice: The term of this patent shall not extend beyond the expiration date of Pat. No. 5,477,123.

[21] Appl. No.: 534,505

[22] Filed: Sep. 27, 1995

Related U.S. Application Data

[62] Division of Ser. No. 353,827, Dec. 12, 1994, Pat. No. 5,477,123.
[51] Int. Cl.⁶ .......................... H01M 10/44; H01M 10/46
[52] U.S. Cl. ................... 320/2; 320/17; 320/39; 307/48
[58] Field of Search ............... 320/2, 6, 15, 17, 320/18, 30, 39, 40, 47; 307/43, 48, 49, 50, 77

[56] References Cited

U.S. PATENT DOCUMENTS 4,143,417  3/1979  Wald et al. ........................ 364/900
4,323,788  4/1982  Smith ............................. 320/1 J X
4,903,222  2/1990  Carter et al. ........................ 364/708
4,908,523  3/1990  Snowden et al. ..................... 307/43
5,030,128  7/1991  Herron et al. .................... 364/708 X
5,477,123  12/1995 Allen et al. ........................... 320/2

Primary Examiner—Peter S. Wong
Assistant Examiner—Gregory J. Toatley, Jr.
Attorney, Agent, or Firm—Wood, Herron & Evans, L.L.P.

[57] ABSTRACT

A circuit for serially connecting multiple batteries to a battery-powered device such as a notebook computer or camcorder so that the device will serially charge or discharge the batteries. The device includes at least two controllable switch circuits for selectively connecting batteries to the battery-powered device, a power flow sensor for sensing power flow from the device to the selected battery or vice-versa, and a selector circuit for sequentially enabling the switch circuits to sequentially connect the batteries to the battery-powered device so that the batteries will sequentially charge or discharge.

20 Claims, 2 Drawing Sheets

CONNECTING MULTIPLE BATTERIES TO BATTERY POWERED DEVICES

This is a division of application Ser. No. 08/353,827, filed Dec. 12, 1994 now U.S. Pat. No. 5,477,123.

FIELD OF THE INVENTION

The present invention relates to battery connection circuits for battery powered electronic circuits.

BACKGROUND OF THE INVENTION

Over the past several years, complex electronic devices such as computers and video cameras have become small enough to be easily portable. Portable, or "notebook", computers have become a popular alternative to traditional desktop computers, and small, hand held video cameras have become an ubiquitous household appliance. These portable devices are typically powered by rechargeable batteries or alternatively by a power adapter which can be connected to an AC outlet. Often it is desirable to operate the devices for lengthy periods of time in environments where AC power is unavailable, for example on airplanes or outdoors.

Though reduced in size, these complex electronic devices consume similar levels of power to their desktop predecessors. As a result, conventional rechargeable batteries, e.g., having a Nickel-Cadmium electrolyte, typically have a very short life—as little as one hour. Short battery life can be a severe constraint on the effective portable use of a device, for obvious reasons.

One known way to extend battery life is to carry extra charged batteries. The extra batteries are charged whenever AC power is available. Then, when AC power is not available, when a battery expires, it can be replaced with another freshly charged battery.

Most battery-powered devices include an internal charger for charging the battery; this charger will begin charging the battery whenever the device is powered by AC power. Thus, one method for charging extra batteries is to serially insert them into the device while the device is connected to AC power. However, this method can be inconvenient. First, the device may or may not indicate when the battery is charged; if there is no such indication the operator must leave each battery connected at least as long as the maximum possible charge time to ensure that the batteries are charged, even if a given battery requires substantially less time to achieve a full charge. Second, even if the device does indicate when the battery is charged, it is inconvenient to constantly monitor the device and replace batteries.

Due to these inconveniences, battery chargers have become popular. Battery chargers have an independent power supply and connectors for accepting one or more batteries to be charged. Thus, a charger can be an efficient way to charge extra batteries; the batteries are simply plugged into the charger, and some time later the batteries are charged.

Another known way to extend battery life is to use batteries having exotic electrolyte technologies which provide longer battery life. For example, longer-life batteries can be made using Nickel metal hydride and Lithium ion electrolytes. Batteries of this type have been found to provide substantially more battery life compared to Nickel-Cadmium electrolyte batteries.

However, these new battery technologies have the difficulty that the battery can be easily damaged by improper charging. Typically, these more exotic batteries must be charged in accordance with very specific voltage and current profiles; if these profiles are not followed, damage could result. Accordingly, these new electrolytes are typically only used with "smart battery" circuitry which includes, in essence, a computer circuit having the sole function of monitoring the performance of the battery and regulating both the charging and discharging of the battery to achieve optimum performance. This smart battery circuit continually communicates with the device or charger connected to the battery to achieve these goals.

While these new technologies have extended battery life, they have substantially increased the cost of battery chargers, because a charger for a smart battery must have sufficient circuitry to communicate with the smart battery and carefully control the charging and/or discharging of the battery to avoid damage. Furthermore, the manner of communication between the battery and charger is typically proprietary to the manufacturer of the battery, increasing the difficulty of making a compatible charger and often preventing third parties from manufacturing compatible chargers and thereby increasing costs to the consumer.

Although this expense can be avoided by simply using the charger built into the battery-powered device, this alternative involves the inconvenience of constantly monitoring the device and swapping the batteries, and, if the device does not indicate whether a battery is charged, may also require the operator to leave a battery connected to the device for a much longer period than is actually necessary to charge the battery.

Thus, particularly in the context of smart batteries, there is a need for a low-cost device for charging batteries which does not require constant monitoring or swapping of batteries, and which does not require the operator to leave a battery connected any longer than is necessary to charge the battery.

SUMMARY OF THE INVENTION

In accordance with principles of the present invention, this need is met by a low-cost circuit which can be connected between the battery connector of a portable electronic device, and a number of batteries. The circuit selectively connects each of the batteries to the connector so that power flows between the connector and exactly one of the batteries. The circuit senses power flow between the selected battery and the connector, and when this power flow decreases below a threshold, the circuit selects another battery for connection to the connector.

This low-cost circuit can therefore be used by an operator to serially connect batteries to the portable device, to automatically charge a number of batteries using the portable device. If the portable device is connected to AC power, the portable device will serially charge each battery. As soon as one battery is charged, the power flow to the battery will decrease below the threshold, and the circuit will select another battery, and the new battery will begin charging.

In the specific implementation described below, the low cost circuit is used in connection with a notebook computer. However, other portable electronic devices, such as camcorders, could also make beneficial use of principles of the present invention. Furthermore, a charger for use with any of these devices can also be suitably combined with the low cost circuit to extend the operation of the charger to additional batteries.

Furthermore, in the specific implementation described below, the low cost circuit includes connectors for four batteries; however, any number of batteries could be connected. Furthermore, in one embodiment shown below, the housing for the low cost circuit has the same footprint as the notebook computer with which it is used; however, other configurations are shown and can be used.

Finally, in the specific implementation described below, the low cost circuit is particularly suited for charging batteries by connection to a computer, camcorder or charger. However, a similar low cost circuit could be used in drawing power from the batteries in a sequential manner without requiring the operator to swap the batteries as they become drained.

The above and other objects and advantages of the present invention shall be made apparent from the accompanying drawings and the description thereof.

The accompanying drawings, which are incorporated in and constitute a part of this specification, illustrate embodiments of the invention and, together with a general description of the invention given above, and the detailed description of the embodiments given below, serve to explain the principles of the invention.

Detailed Description of Specific Embodiments

Figure 1:
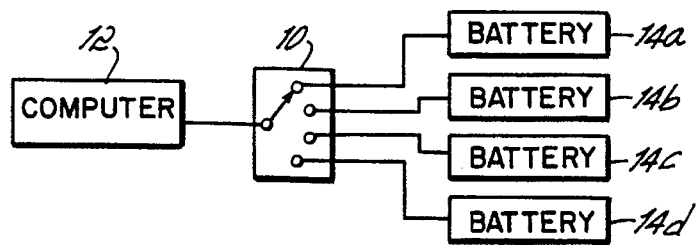
FIG. 1 is a simplified illustration of a low-cost circuit 10 in accordance with the invention connected between a computer 12 and batteries 14.

Referring to FIG. 1, in a simplified view, in accordance with principles of the present invention, a circuit 10 is interposed between a computer 12 or other portable electronic device and a number of batteries 14a, 14b, 14c and 14d. In essence, circuit 10 provides a switchable connection, such that a selected one of the batteries 14 is connected through circuit 10 to computer 12. As noted above, circuit 10 will connect batteries serially to computer 12, while monitoring power flow between computer 12 and the selected battery 14. When the power flow between computer 14 and the selected battery 14 reduces below a threshold, circuit 10 will select another battery for connection to computer 12.

Figure 2:
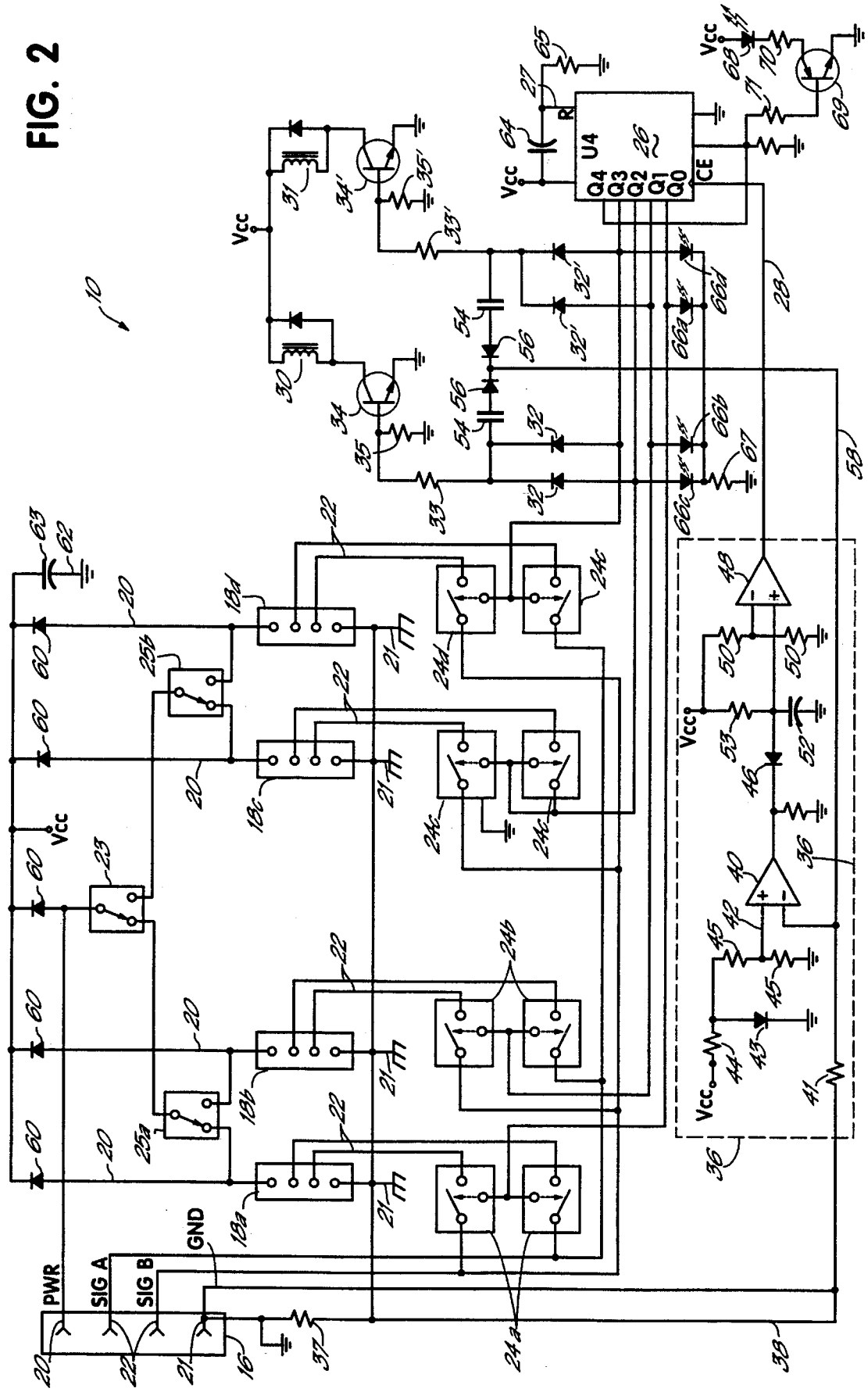
FIG. 2 is a circuit diagram of a implementation of circuit 10.

Referring to FIG. 2, an electrical circuit 10 for performing these functions includes a connector 16 for connection to computer 12 and four connectors 18a, 18b, 18c and 18d respectively for connection to batteries 14a, 14b, 14c and 14d. Each connector includes four terminals. The connectors include power and ground terminals 20 and 21 through which electrical power flows from a battery to the computer or vice versa. Each connector also includes two signal lines 22 through which electrical signals flow to facilitate communication between computer 12 and batteries 14. The format and timing of the signals on lines 22 is not relevant to the invention, and in fact does not need to be known to manufacture a suitable circuit 10, since circuit 10 simply connects between computer 12 and a battery 14 and does not receive or interpret communications on lines 22. It should also be noted that while the disclosed embodiment includes two signal lines 22 in other embodiments there may be only one signal line 22 or three or more signal lines 22 connected between computer 12 and battery 14, as is required by the proprietary smart battery scheme of the manufacturer of the computer or other device 12. In any of these cases, it is not necessary to understand the nature of the communications on signal lines 22, but only to include a connectors 16 and 18 which suitably connect to signal lines 22 and a circuit 10 which can provide connections between connector 16 and one of connectors 18.

In the circuit illustrated in FIG. 2, power is coupled from connector 16 to a selected one of connectors 18 via three relays 23, 25a and 25b. When the battery 14 connected to connector 18a is enabled, relays 23 and 25a are in the positions illustrated in FIG. 2 and therefore, power is directly coupled from terminal 20 of connector 16 to terminal 20 of connector 18a. Other states of relay 23 and relays 25a and 25b couple power from terminal 20 of connector 16 to a terminal 20 of any of the remaining three connectors 18b, 18c and 18d. The manner in which relay 23 and relays 25a and 25b are controlled is discussed in further detail below.

Signal lines 22 of connector 16 are selectively connected to one set of signals lines 22 in a connector 18a, 18b, 18c or 18d via one of four pairs of transmission gates 24a, 24b, 24c or 24d. Suitable transmission gates 24 are available in integrated circuit form from a number of integrated circuit manufacturers under the TTL Part No. 4066. Each respective pair of transmission gates 24a, 24b, 24c or 24d is coupled between signal lines 22 of connector 16 and a respective pair of signals lines 22 in a connector 18a, 18b, 18c or 18d. Thus when transmission gates 24a are enabled signal lines 22 of connector 16 are connected to signal lines 22 of connector 18a. Similarly, when transmission gates 24b are enabled, signal lines 22 of connector 16 are connected to signal lines 22 of connector 18b, and so forth.

Logical signals which enable transmission gates 24 and control relays 23 and 25 are produced by a Johnson counter 26 as output lines $Q_0$, $Q_1$, $Q_2$, and $Q_3$. A suitable Johnson counter 26 can be obtained in integrated circuit form from a number of integrated circuit manufacturers under TTL Part No. 4022. Johnson counter 26 produces exactly one logic high voltage on its outputs $Q_0$, $Q_1$, $Q_2$, $Q_3$ and $Q_4$. All other outputs have a logic zero value. When Johnson counter 26 is reset by a logic low signal on its reset input 27, Johnson counter 26 produces a high logic level on its $Q_0$ output and a low logic level on its remaining outputs $Q_1$, $Q_2$, $Q_3$ and $Q_4$. Johnson counter 26 will remain in this state until the reset signal is removed from line 27. Thereafter, Johnson counter 26 will remain in this state until a transition is detected at its clock input signal on line 28. When a transition is detected on line 28, Johnson counter 26 advances, setting a low logic level on its output $Q_0$ and a high logic level on its output $Q_1$, retaining low logic levels on its remaining outputs $Q_2$, $Q_3$ and $Q_4$. Johnson counter 26 will remain in this state until a second transition is detected on clock line 28, at which time Johnson counter 26 further advances, placing a logic low level on its output $Q_1$, and setting a high logic level on its output $Q_2$. Further transitions on clock line 28 causes Johnson counter 26 to advance a logic high level its output $Q_3$ and subsequently to its output $Q_4$.

The output $Q_4$ of Johnson counter 26 is coupled to the clock enable input CE of Johnson counter 26. As a result, when Johnson counter 26 advances to put a high level on its output $Q_4$, this high level will also be presented to the clock enable input of Johnson counter 26. When a high level appears at the clock enable input of Johnson counter 26, Johnson counter 26 will no longer advance upon transitions on the clock input line 28. As a result, Johnson counter 26 will not advance past the state in which its output $Q_4$ has a high logic level.

Outputs $Q_0$, $Q_1$, $Q_2$, and $Q_3$ of Johnson counter 26 are respectively coupled to transmission gates 24a, 24b, 24c and 24d. Transmission gates 24 will be enabled only when a high logic level is applied to control inputs of the transmission gates from an output of Johnson counter 26. Therefore, when Johnson counter 26 is in its initial, reset state, transmission gates 24a are enabled and transmission gates 24b, 24c and 24d are disabled. Thus, in this state signal lines 22 of connector 16 are coupled through transmission gates 24a to signal lines 22 of connector 18a, but are disconnected from signal lines 22 of connectors 18b, 18c and 18d. Similarly, when Johnson counter 26 has advanced so that its output line $Q_1$ is at a high logic level, signal lines 22 of connector 16 are coupled through transmission gates 24b to signal lines 22 of connector 18b, but are disconnected from signal lines 22 of connectors 18a, 18c and 18d. In the same manner, Johnson counter 26 output $Q_2$ enables transmission gates 24c connecting connector 18c to connector 16, and output $Q_3$ enables transmission gates 24d and connector 18d to connector 16.

Relays 23 and 25a and 25b are also controlled by outputs $Q_0$, $Q_1$, $Q_2$, and $Q_3$ of Johnson counter 26. This control is achieved by applying current to one of two relay control coils 30 and 31. Relay control coil 30 controls relay 23, and relay control coil 31 controls relays 25a and 25b. When no current is flowing through control coil 30, relay 23 forms a connection between power line 20 of connector 16 and the common terminal of relay 25a. However, when current is flowing through relay control coil 30, relay 23 forms a connection between power line 20 of connector 16 and the common terminal of relay 25b. Similarly, when no current is flowing through relay control coil 31, relays 25a and 25b connect signal terminals of relay 23 to terminals 20 of connectors 18a and 18c, respectively; however, when current is flowing through relay control coil 31, relays 25a and 25b form connections between signal terminals of relay 23 and terminals 20 of connectors 18b and 18d.

Outputs of Johnson counter 26 connect through circuitry discussed in this paragraph to cause relay control coils 30 and 31 to set relays 23 and 25a and 25b into the appropriate states. Specifically, when either of outputs $Q_2$ or $Q_3$ are at a high logical state, current flows through one of diodes 32 and through a 10 kiloohm resistor 33 to cause transistor 34 to turn on and draw current through relay control coil 30. However, when neither of outputs $Q_2$ nor $Q_3$ is at a high logical state, a 10 megaohm pull down resistor 35 causes transistor 34 to turn off and prevents current flow through relay control coil 30. Thus, whenever outputs $Q_2$ or $Q_3$ are in a high logical state, relay 23 provides an electrical connection between power terminal 20 of connector 16 and common terminal of relay 25b. Otherwise, relay 23 provides a connection between power terminal 20 of connector 16 and the common terminal point of relay 25a.

Similarly, when output $Q_1$, or $Q_3$ of Johnson counter 26 are in a high logical state, current flows through one of two diodes 32' and resistor 33' to turn on transistor 34' and cause current flow through relay control coil 31, but when no high logical state appears on outputs $Q_1$ or $Q_3$, pull down resistor 35' causes transistor 34' to turn off and prevents current flow through relay control coil 31. As a result, when $Q_1$, or $Q_3$ have a high logical state, relays 25a and 25b couple signal terminals of relay 23 to connectors 18b and 18d, respectively. Otherwise, relays 25a and 25b couple signal terminals of relay 23 to connectors 18a or 18c.

By considering the above it can be seen that signal terminals 22 and power terminal 20 of connector 18a will be connected to the corresponding terminals of connector 16, if and only if, output $Q_0$ of Johnson counter 26 has a high logical state. Similarly, these terminals 22 of connector 18b will connect to corresponding terminals 22 of connector 16C, if and only if, output $Q_1$ of Johnson counter 26 has a logical state. Moreover, a high logical state on output $Q_2$ of Johnson counter 26 causes terminals 22 of connector 18c to connect to connector 16, and a high logical states of output $Q_3$ of Johnson counter 26 causes terminals 22 of connector 18d to connect to connector 16.

Circuit 10 includes a power monitoring circuit 36, which detects power flow from connector 16 to one of connectors 18a, 18b, 18c or 18d. Circuit 36 detects power flow by a 0.1 ohm sense resistor 37 which is coupled between the ground terminals 21 of connectors 18a, 18b, 18c and 18d and the ground terminal of connector 16. (The common terminal of the circuitry of circuit 10 is coupled to the ground terminal of connector 16.) A sense voltage develops across resistor 37 whenever current flows between connector 16 and one of connectors 18, indicative of power flow from computer 12 to one of batteries 14. This voltage, which appears on line 38, is detected by a comparator 40. The voltage on line 38 is coupled to the inverting input of comparator 40 via a 10 kiloohm resistor 41. The non-inverting input of comparator 40 is coupled to a threshold voltage on line 42 of approximately 50 millivolts. This threshold voltage is produced on line 42 by a forward biased diode 43, which produces a 0.6 volt voltage in response to current flowing through a 9.1 kiloohm resistor 44. The 0.6 volt voltage across diode 43 is divided by a factor of eleven by resistors 45 (which have values of 100 kiloohm, and 9.1 kiloohm). So long as the voltage on line 38 exceeds 50 millivolts, the output of comparator 40 remains at a low level. However, when the voltage on line 38 decreases below 50 millivolts, indicative of a current through resistor 37 of less than 500 milliamps, the output of comparator 40 will switch to a high logic level.

The output of comparator 40 is coupled through diode 46 to the non-inverting input of a second comparator 48. The inverting input of comparator 48 remains at a voltage of approximately of one-half of the supply voltage, this voltage being produced by two 1.0 kiloohm resistors 50 and 51. Thus, whenever the non-inverting input of comparator 48 has a voltage less than one-half the supply voltage $V_{cc}$, comparator 48 will produce a logic low output; otherwise, comparator 48 will product a logic high output.

The operation of circuit 36 proceeds as follows: whenever a current greater than approximately 500 milliamps is flowing through sense resistor 37, comparator 40 produces a logic low output causing capacitor 52 to remain discharged to a voltage less than one-half of the supply voltage Vcc. As a result, comparator 48 produces a logic low output level on line 28. However, when the current in sense resistor 37 decreases below approximately 500 milliamps, comparator 40 produces a logic high output. As a result, capacitor 52 begins charging towards supply voltage $V_{cc}$ through resistor 53. Resistor 53 and capacitor 52 have a RC time constant of approximately 100 seconds. Thus, if current flow through sense resistor 37 remains below 500 milliamps for longer than 100 seconds, capacitor 52 will charge to a voltage near to the supply voltage $V_{cc}$ and, as a result, the voltage of the non-inverting input of comparator 48 will become greater than the voltage of the inverting input of comparator 48, and comparator 48 will produce a logic high output on line 28. This transition from a low to high level on line 28 causes Johnson counter 26 to increment to its next state, connecting a new battery in a connector 18 to the computer 12 in connector 16. The transition of Johnson counter 26 to a new state will cause one of output lines $Q_0$, $Q_1$, $Q_2$, or $Q_3$ to have a transition from a low to high logic state. This transition will be coupled through a diode 32 or 32' and through a coupling capacitor 54 and diode 56 onto line 58. The brief positive transition coupled to line 58 is directly coupled to the non-inverting input of comparator 40, and will cause comparator 40 to produce a low output logic. This brief low logic level will cause capacitor 52 to discharge through diode 46 to a voltage near to ground. As a result, the output of comparator 48 will transition to logic low level. If current begins flowing through sense resistor 37 from the newly connected battery, comparator 40 will detect voltage on line 38 and will continue to produce a logic low output level, holding comparator 48 output on line 28 at a logic low output level. However, if there is no current flow between the newly selected battery at connector 18 and connector 16, comparator 40 will again produce a logic high level at its output. After approximately 100 seconds, capacitor 52 will recharge near to the supply voltage Vcc through resistor 53, and comparator 48 will once again produce a high logic level on line 28. This high logic level will cause Johnson counter 26 to clock to another state.

Thus, in accordance with the above operation of circuit 36, circuit 10 connects each connector 18a, 18b, 18c and 18d to connector 16. A connection between a connector 18 and connector 16 will be retained only so long as current is detected by sense resistor 37. If no current is detected, circuit 36 will cause Johnson counter 26 to advance to a subsequent state. This process will continue until all connectors 18 have been selectively connected to connector 16, at which time, Johnson counter 26 advances to a state in which its output $Q_4$ has a high level, so that Johnson counter 26, and circuit 10, becomes disabled and will no longer advance in response to transition on line 28.

The power monitoring circuit 36 shown in FIG. 2 responds only to positive power flow from connector 16 to one of connectors 21; thus, this circuit is intended only for use in sequentially charging batteries coupled to connectors 21, and not for sequentially discharging batteries in connectors 21. However, a power monitoring circuit 36 could be used to detect power flow in the opposite direction, and thereby allow circuit 10 to sequentially discharge batteries in connectors 18.

In one embodiment, circuit 10 can be modified to discharge batteries by connecting line 38 to the ground terminal 21 of connector 16, and connecting the common terminal of the circuitry of circuit 10 to the ground terminals 21 of connectors 18 rather than to the ground terminal 21 of connector 16. With this configuration, circuit 10 would monitor positive power flow from one of connectors 18 to connector 16, and sequentially form connections between connectors 18 and connector 16 when this power flow reduced below a threshold value, thereby causing the batteries in connectors 18 to sequentially discharge.

In a further embodiment, circuit 10 may include two commonly-switched single-pole double-throw switches, where the throws of the switches are coupled to the ground terminal of connector 16 and the ground terminals of connectors 18, and the two poles of the switches are connected to line 38 and the common terminal of the circuitry of circuit 10, so that, with one setting of the switches, circuit 10 takes the configuration shown in FIG. 2 and is configured to charge batteries in connectors 18, and with the other setting of the switches, circuit 10 takes the configuration described in the preceding paragraph and discharges batteries in connectors 18.

Power is supplied to the circuit 10 by any battery connected to a connector 18 or by the computer or other device connected to connector 16. Diodes 60 are coupled between each terminal 20 of connectors 16 and 18 and a power supply terminal $V_{cc}$. A 10 microfarad bypass capacitor 63 stabilizes the power supply voltage $V_{cc}$.

When power is initially applied to circuit 10, by inserting a battery into a connector 18, or by inserting connector 16 into computer 12 or another portable electronic device, Johnson counter 26 is reset by a logic high level on line 27 produced by current flow through capacitor 64 and resistor 65. After approximately 1 second, capacitor 64 charges through resistor 65 and a logic low level is applied to line 27, so that Johnson counter 26 is no longer forced into a reset state. Thus when power is first applied to circuit 10 the battery connected to connector 18a is initially connected to connector 16. Thereafter, circuit 10 selectively connects the battery in connector 18b, 18c and 18d whenever low current levels are detected between current 12 and the currently selected battery.

Circuit 10 includes a number of light emitting diodes which indicate the current operative state of circuit 10. Diodes 66a, 66b, 66c and 66d are respectively connected to outputs $Q_0$, $Q_1$, $Q_2$, and $Q_3$ of Johnson counter 26 and indicate respectively, the connection of connector 18a, 18b, 18c or 18d to connector 16. Current flows through diodes 66 from outputs $Q_0$, $Q_1$, $Q_2$, and $Q_3$ via 1.5 kiloohm resistor 67, causing one diode 66 to illuminate for each state of Johnson counter 26. Furthermore, when Johnson counter 26 reaches its final state and output $Q_4$ is at a logic high level, diode 68 is illuminated by current flow through transistor 69 and 1.0 kiloohm resistor 70. Transistor 69 is turned on when output $Q_4$ has a high logic state by current flowing through ten kiloohm base resistor 71.

Figure 3:
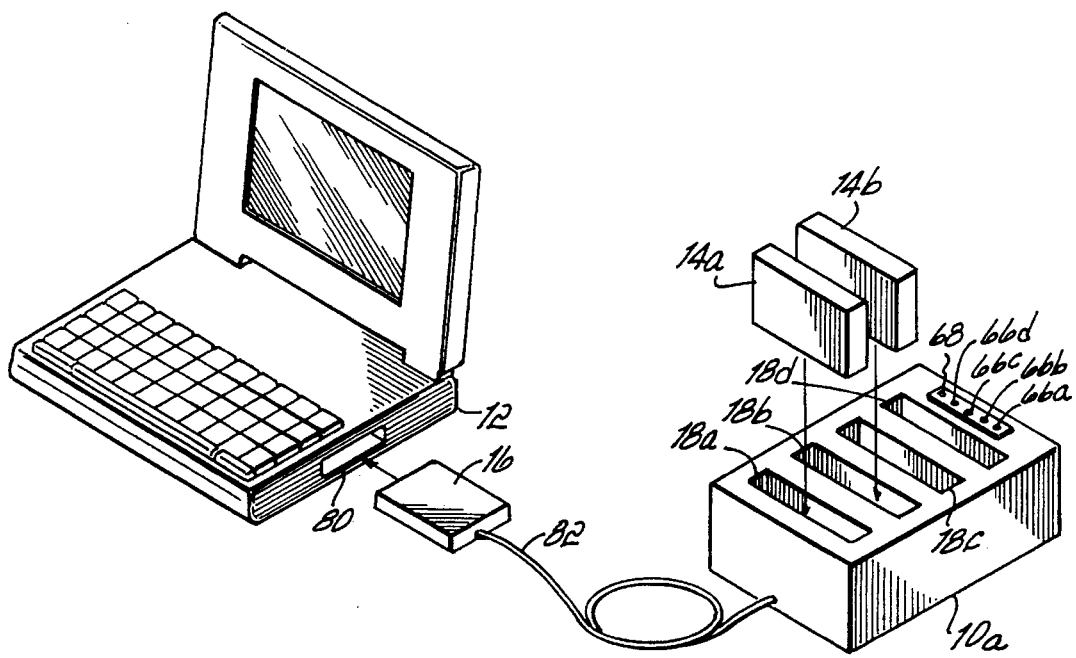
FIG. 3 is an illustration of one embodiment of a housing for circuit 10 shown in conjunction with computer 12 and batteries 14.

Referring to FIG. 3, the housing 10a which contains circuit 10 (FIG. 2) may take a number of forms. As shown in FIG. 3, one suitable housing 10a includes an array of connectors 18a, 18b, 18c and 18d on a planar surface of a rectangular box. Batteries 14a, 14b, etc. are inserted into their respective connectors 18 for charging. Connector 16 which is plugged into the battery socket of computer 12 is connected via a four-terminal wire 82 to housing 10a.

Figure 4:
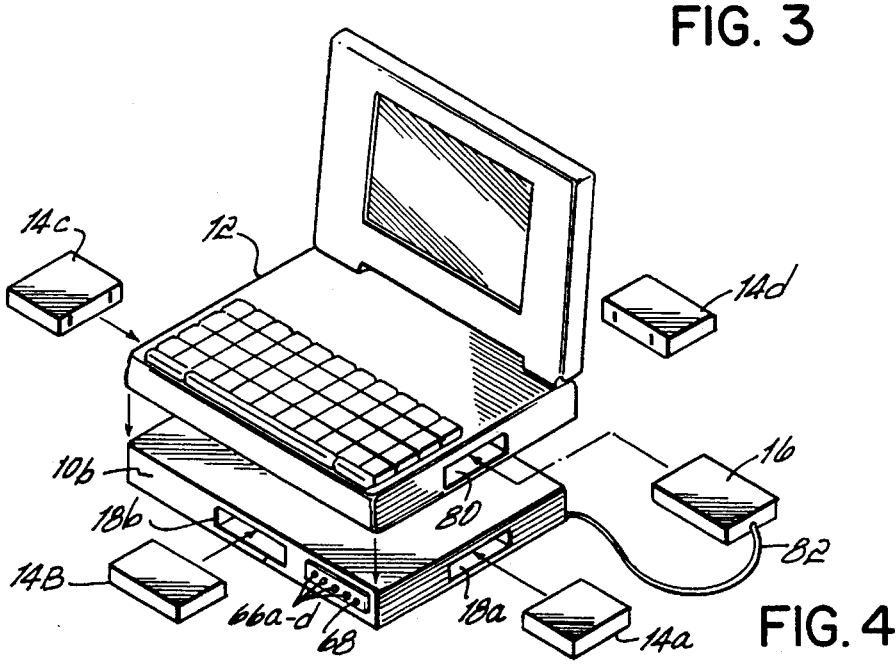
FIG. 4 is an illustration of another embodiment of a housing for circuit 10 shown in conjunction with computer 12 and batteries 14.

Referring to FIG. 4, in another embodiment of the present invention, circuit 10 (FIG. 2) is contained within a housing 10b having a similar footprint to computer 12. Connectors 18a, 18b, 18c and 18d are mounted peripheral surfaces on the housing 10b such that batteries 14a, 14b, 14c and 14d may be inserted into corresponding connectors horizontally. Connector 16, which can be inserted into the battery socket 18 of computer 12 is similarly connected by four-terminal wire 82 to the circuitry inside of the housing 10b.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A circuit for connection between multiple batteries and a battery using device, comprising at least first and second battery connectors for connection to said multiple batteries, said battery connectors including connections carrying electrical power, a device connector for connection to a battery socket of said battery using device, said device connector including connections carrying electrical power, a controllable switch circuit coupled between said battery connectors and said device connector, said switch circuit being enabled in response to a first control signal to provide an electrical connection between respective power connections of said device connector and respective power connections of said first battery connector, and enabled in response to a second control signal to provide an electrical connection between respective power connections of said device connector and respective power connections of said second battery connector, a power flow sensor sensing power flow between one of said battery connectors and said device connector, determining when said power flow decreases below a threshold, and generating a low power signal, a selector circuit producing said control signals, said selector circuit responding to said low power signal while producing said first control signal, by terminating said first control signal and initiating said second control signal, to thereby connect said second battery connector to said device connector when low power flow is detected between said first battery connector and said device connector.

2. The circuit of claim 1 wherein said device connector is configured for connection to a battery socket of a portable computer and said battery connectors are configured for connection to batteries configured for connection to said portable computer.

3. The circuit of claim 1 further comprising a housing enclosing said circuit, at least one surface of said housing having a profile compatible with a surface profile of said portable computer.

4. The circuit of claim 1 wherein said device connector is configured for connection to a battery socket of a portable video recorder and said battery connectors are configured for connection to batteries configured for connection to said video recorder.

5. The circuit of claim 1 further comprising a third battery connector for connection to a battery, said third battery connector including connections carrying electrical power, wherein said switch circuit is further coupled between said third battery connector and said device connector, said switch circuit being enabled in response to a third control signal to provide an electrical connection between respective power connections of said device connector and respective power connections of said third battery connector, and said selector circuit sequentially connects each said battery connector to said device connector in response to receipt of low power signals from said power flow sensor.

6. The circuit of claim 1 wherein said power flow sensor detects power flow from said device connector to any of said battery connectors, and produces said low power signal when power flow from said device connector reduces below a threshold value, whereby a battery charger in the battery using device will sequentially charge any batteries coupled to said battery connectors.

7. The circuit of claim 1 wherein said power flow sensor detects power flow from any of said battery connectors to said device connector, and produces said low power signal when power flow to said device connector reduces below a threshold value, whereby the portable device will sequentially discharge any batteries coupled to said battery connectors.

8. The circuit of claim 1 further comprising a housing enclosing said circuit.

9. The circuit of claim 1 further comprising a visual indicator connected to said selector circuit and visually indicating which of said first and second control signals is being produced by said selector circuit.

10. The circuit of claim 1 wherein said first and second control signals are produced by said selector circuit on first and second signal lines connected to said switch circuit.

11. The circuit of claim 1 wherein said switch circuit comprises first and second groups of single-pole switches, each switch being connected between respective power connections of a battery connector and respective power connections of a device connector.

12. The circuit of claim 1 wherein said power flow sensor further comprises a manual switch having charge and discharge positions, said power flow sensor detecting power flow from said device connector to said battery connectors when said manual switch is in said charge position, said power flow sensor detecting power flow from said battery connectors to said device connector when said manual switch is in said discharge position.

13. The circuit of claim 1 wherein said power flow sensor comprises a sense resistor having two terminals, one said terminal connected to a power connection of said device connector and the other said terminal connected to a power connection of each of said battery connectors.

14. A battery sequencer for connection between multiple batteries and a battery powered portable computer which has a socket for connection to a single battery, comprising a housing having a surface profile compatible with a surface profile of said portable computer, at least first and second battery sockets in said housing for connection to said multiple batteries, said battery sockets including connections for carrying electrical power, a plug for connection to said socket of said portable computer, said plug including connections for carrying electrical power, a controllable switch circuit coupled between said battery sockets and said plug, said switch circuit being enabled in response to a first control signal to provide an electrical connection between respective power connections of said plug and respective power connections of said first battery socket, and enabled in response to a second control signal to provide an electrical connection between respective power connections of said plug and respective power connections of said second battery socket, a power flow sensor sensing power flow between said plug and one of said battery sockets, determining when said power flow decreases below a threshold, and generating a low power signal, a selector circuit producing said control signals, said selector circuit responding to said low power signal while producing said first control signal, by terminating said first control signal and initiating said second control signal, to thereby connect said second battery socket to said plug when low power flow is detected between said plug and said first battery socket.

15. The battery sequencer of claim 14 wherein said power flow sensor further comprises a manual switch having charge and discharge positions, said power flow sensor detecting power flow from said plug to said battery sockets when said manual switch is in said charge position, said power flow sensor detecting power flow from said battery sockets to said plug when said manual switch is in said discharge position.

16. The battery sequencer of claim 14 wherein said power flow sensor detects power flow from said plug to said battery sockets, whereby a battery charger in the portable computer will sequentially charge batteries coupled to said battery connectors.

17. The battery sequencer of claim 14 wherein said power flow sensor detects power flow from said battery sockets to said plug, whereby batteries in said battery sequencer will sequentially power the portable computer.

18. A method of sequentially connecting multiple batteries to a battery powered portable computer which has a socket for connection to a single battery, comprising connecting said batteries to multiple battery sockets, said sockets including connections for carrying electrical power, connecting a plug to said socket of said portable computer, said plug including connections for carrying electrical power, coupling a first battery socket to said plug, to provide an electrical connection between respective power connections of said plug and respective power connections of said first battery socket, sensing power flow between said plug and said first battery socket via said power connections of said plug and first battery socket, and when said power flow decreases below a threshold, uncoupling said first battery socket from said plug and coupling a second battery socket to said plug to provide an electrical connection between respective power connections of said plug and respective power connections of said second battery socket.

19. The method of claim 18 applied to sequentially charging batteries coupled to said battery sockets, wherein said sensing step senses power flow from said plug to said first battery socket.

20. The method of claim 18 applied to powering the portable computer with batteries, wherein said sensing step senses power flow from said first battery socket to said plug.

* * * * *